United States Patent [19]

Nishikama

[11] Patent Number: 4,847,490

[45] Date of Patent: Jul. 11, 1989

[54] OPTICAL CODE READING DEVICE WHOSE LASER READING LIGHT IS TRANSMITTED BY ONLY ONE SINGLE MODE OPTICAL FIBER

[75] Inventor: Mitsuru Nishikama, Osaka, Japan

[73] Assignee: Sumitomo Electric Industries, Ltd., Osaka, Japan

[21] Appl. No.: 111,639

[22] Filed: Oct. 23, 1987

[30] Foreign Application Priority Data

| Oct. 24, 1986 | [JP] | Japan | 61-254232 |
| Jun. 19, 1987 | [JP] | Japan | 62-153980 |
| Jun. 30, 1987 | [JP] | Japan | 62-164764 |

[51] Int. Cl.⁴ ............................................. G06K 7/10
[52] U.S. Cl. .................................... 250/227; 235/472; 235/473
[58] Field of Search ............. 250/277, 234, 235, 566, 250/568; 235/454, 461, 468, 472, 473, 462

[56] References Cited

U.S. PATENT DOCUMENTS

| 3,449,587 | 6/1969 | Barnes | 250/234 |
| 3,475,612 | 10/1969 | Stupar et al. | 250/227 |
| 3,584,779 | 6/1971 | Kessler et al. | 250/227 |
| 3,711,723 | 1/1973 | McMurtry | 235/472 |
| 3,809,893 | 5/1974 | Dobras | 250/227 |
| 3,916,184 | 10/1975 | Turner et al. | 250/227 |
| 3,937,558 | 2/1976 | Mukai et al. | 250/227 |
| 3,983,389 | 9/1976 | Cowardin et al. | 250/227 |
| 4,286,145 | 8/1981 | Palmer | 235/473 |
| 4,560,862 | 12/1985 | Eastman et al. | 235/472 |
| 4,645,915 | 2/1987 | Van Ruyven | 235/472 |
| 4,673,805 | 6/1987 | 235 | 472/ |
| 4,725,727 | 2/1988 | Harder et al. | 250/227 |

FOREIGN PATENT DOCUMENTS 0137966 4/1985 European Pat. Off. .

Primary Examiner—Edward P. Westin
Attorney, Agent, or Firm—Cushman, Darby & Cushman

[57] ABSTRACT

An optical code reading device comprises a light source and scanning head for projecting light for illuminating a code to be read, only one single mode optical fiber for transferring the light from the light source so that the spot size can be made as small as possible and shape of the light can be a true circle.

13 Claims, 5 Drawing Sheets

OPTICAL CODE READING DEVICE WHOSE LASER READING LIGHT IS TRANSMITTED BY ONLY ONE SINGLE MODE OPTICAL FIBER

BACKGROUND OF THE INVENTION (a) Field of the Invention

The present invention relates to an optical code reading device. More specifically, the present invention provides an optical code reading device using one or more optical fibers for transmitting light from a light source to a scanning head of the device.

(b) Description of the Prior Art

Code reading devices of handy scanner type for reading characters and various kinds of code such as bar codes have been known.

The handy scanner comprises a housing of a predetermined shape suitable for operating by hand, a light source for illuminating an object to be read, an optical system for receiving reflection light reflected from the object and for forming an image of the object, a sensor for converting the optical image obtained by the optical signal into an electrical signal and a circuit arrangement for processing the electric signal from the sensor to produce a digital signal in a binary form or binary decimal form. A one dimensional image sensor or two dimensional image sensor may be used. The use of two dimensional image sensor enables the object of two dimensions to be read in an instant. When a one dimensional image sensor is used, the object is read by scanning sequentially in a direction of the array of the photo sensor cells of the image sensor. The scanning in the direction of the array of the photo sensor cells is referred to as a main scanning. In order to read the object, the scanner is moved in a direction perpendicular to the main scanning direction, so that the two dimensional object can be read. In case the image sensor having one dimension or two dimension is used as the sensor of the code reading device, the resolution of reading the object depends on the size of the unit photo sensor cells. Moreover, since it is required to illuminate a region expanding in one dimension or two dimensions when the sensor of one dimension or two dimension image sensor is used, an incadescent lamp is used as the light source and the light is dispersed. Thus the light source can be deemed as a surface light source.

A photo diode may be used as a sensor for reading object code. In this case the scanner may be moved in one dimension or two dimensions to obtain the image information of the object. By measuring the amount of the movement of the scanner, the point corresponding to the photo diode output can be identified.

When a photo diode is used as the sensor, it is impossible to obtain the image information of the object at two points simultaneously but it is possible to obtain the image information of the object at only one point simultaneously. In this arrangement, it is necessary to concentratedly illuminate the light beam on one point of the object with the remainder of the object unilluminated so as to detect the reflection light only from the point illuminated by the photo diode. The diameter of the light beam defines the resolution of reading the code. Therefore, it is important to illuminate the object reducing the spot size of the light beam as small as possible.

In the conventional code reading device using the photo diode as the sensor, the light projected from a light source is directly concentrated by a lens system so that the spot size is throttled and the throttled light is projected directly to the object.

The light projected on the object is reflected and the reflected light is received by the photo diode which generates the information of the intensity of the reflected light. Since a portion of the object which is not illuminated does not generate reflection light, no effect is revealed on the output of the photo diode with respect to any pattern on that portion.

As mentioned above, the resolution of reading of the object is decided by the spot size of the illumination light, therefore, it is desired to make the spot size as small as possible.

The spot size of the light projected from the light is more or less wide and in many cases the shape of the spot of the light is not a true circle but is deformed from the true circle. Therefore, even if the projected light is concentrated by the lens system, it is difficult to throttle the light into a desirably fine beam. Accordingly, the resolution of reading the object in the reading device can not be improved.

Moreover, the scanning head of the conventional code reading device is provided with a light source and a rotatable mirror to direct the light beam of the light source toward a light projection window of the scanning head so that the light beam can be projected from the window to scan the object.

The conventional arrangement mentioned above must provide the rotational mirror in the scan head as a part of the optical system. Moreover, if the rotational mirror collects moisture or foreign matters, the reflection light from the mirror is reduced. In addition, according to the distribution of the stain of the mirror, the light intensity of the mirror is changed, whereby it becomes impossible to identify the object code and a reading error may occur.

Moreover, since the mirror and light source are provided in the scanning head, it is difficult to reduce the weight and size of the scanning head.

Moreover, in the conventional code reading device, when a semiconductor laser is used for the reading light, since the reading light is infra red light with the wave length less than 750 nm which is invisible to the human eyes. In case a gas laser such as Ar laser or He-Ne laser is used as the light source, since the spot size of the light is very small, it is difficult to see the light beam.

In this case, in order to see the reading light (defined as reading $\Sigma$), there is proposed to attach an auxiliary light or sighting light $\pi$. In this arrangement, in the prior art, two light sources of the light $\Sigma$ and $\pi$ are disposed in a rectangular relation and both lights are combined using a half mirror. However, employment of the half mirror in the path of the reading light $\Sigma$ causes the intensity of the reading light to be decreased and spot size of the reading light at the object to be read is expanded and the resolution is decreased. Moreover, employment of the half mirror in the scanning head makes the scanning head bulky. Moreover, an adjustment between the axes of the reading light and sighting light is required.

SUMMARY OF THE INVENTION

An essential object of the present invention is to provide an optical code reading device having a high reading resolution.

Another object of the present invention is to provide an optical code reading device having a good resistance against the atmosphere with a scanning head the weight and size of which can be reduced.

A still further object of the present invention is to provide an optical code reading device in which the size and weight of a scanning head can be reduced.

A still further object of the present invention is to provide a scanning head for use in an optical code reading device which is light in weight and small in size and resolution of reading object is high.

According to the present invention, there is provided an optical code reading device which comprises a light source for emitting reading light for illuminating an object to be read, at least one optical fiber for transferring the reading light from the light source having its one end positioned to receive the reading light from the light source, a lens system disposed to receive the reading light projected from the other end of the optical fiber and to project the reading light toward the object, light detecting means for receiving the light reflected from the object to generate electric signals representing intensity of the reflected light and processing means for processing the electric signal to generate electric signal representing the object.

These and other objects and features of the present invention will be made apparent from the description of the preferred embodiments with reference to the attached drawings.

DETAILED DESCRIPTION OF THE PREFERRED EMBODIMENTS

Figure 1:
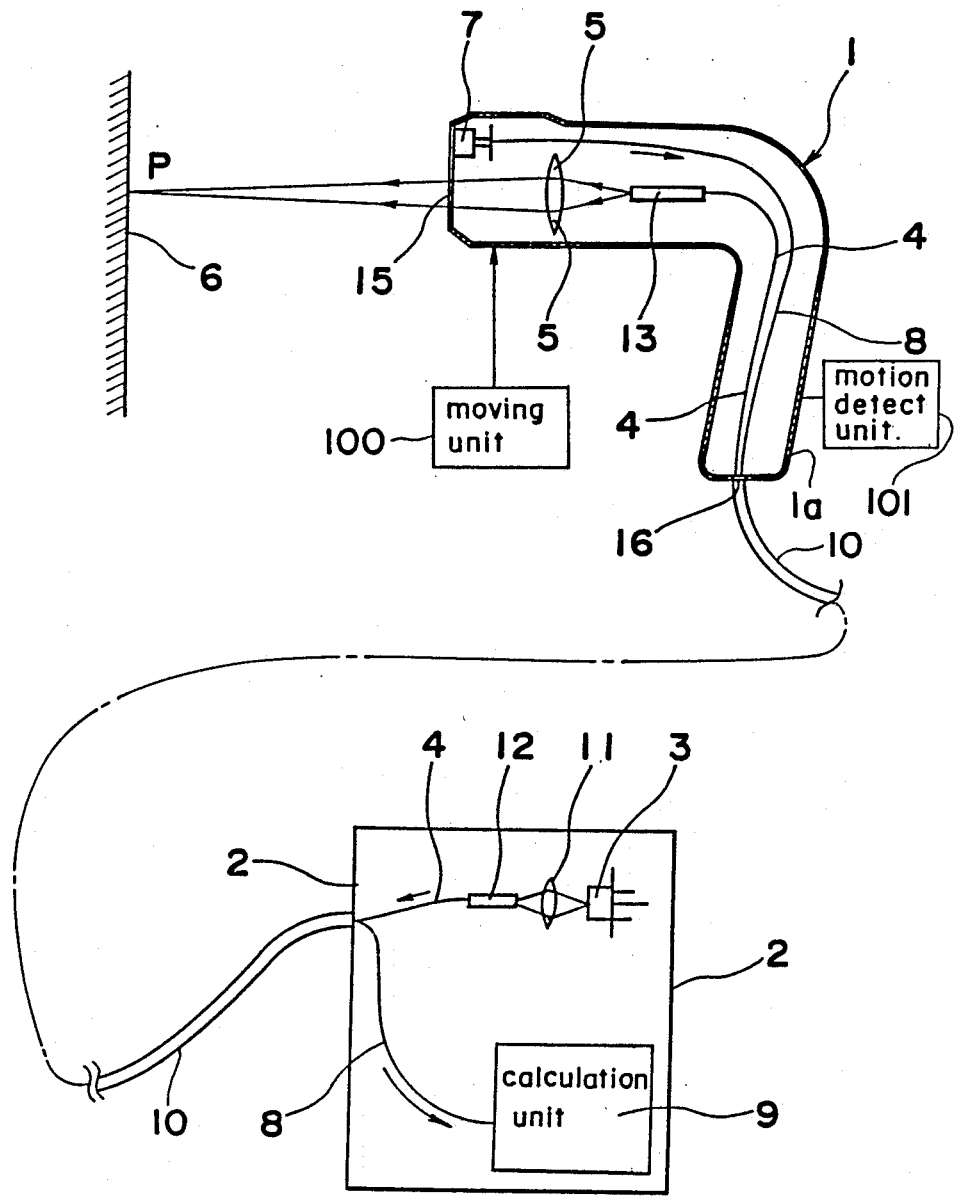
FIG. 1 is a cross sectional view showing an embodiment of an optical code reading device according to the present invention.

A scanning head 1 comprises a housing 1a made of a generally L character shape and is movable in one dimension or two dimensions in parallel with a surface of an object 6 to be read.

There are provided a moving unit 100 for moving the scanning head 1 and a motion detecting unit 101 for detecting the amount of movement of the scanning head 1 so as to make it possible to identify the read position and the information which is obtained at the read position.

A floor type unit 2 secured on a suitable flour or the like is provided with a light source and data processing circuit. It is noted that conventionally the light source is provided in the scanning head, but in the preferred embodiment of the present invention, the light source is provided in the floor type unit 2.

As the light source 3, a semiconductor laser is used. The light emitted from the light source 3 is throttled by a lens 11. The light thus throttled is applied to an entrance unit 12 of a single mode optical fiber 4. The single mode optical fiber means such an optical fiber that allows to pass only the 0 dimensional mode light of the incident light with the wave length Λ. The diameter of the core is extremely small. Therefore, it is necessary to use the coupling lens 11 so that the light of the light source can be entered in the optical fiber core as many as possible. To use the coupling lens is a known technology.

The semiconductor laser is small in size and the life is long enough, and is suitable as the light source.

However, as the light source, any other types such as He-Ne laser, Ar laser may be used except that the color of light is limited. He-Ne laser may be suitable since He-Ne laser has a good directionality and is inexpensive and the light therefrom is visible.

In case green light is required, an Ar laser may be used as the light source.

A calculation unit 9 is provided in the floor type unit 2.

The single mode optical fiber 4 for transferring the light from the light source and a communication cable 8 connected to the calculation unit 9 are covered by a common sheath 10. Both ends of the optical fiber 4 and communication cable 8 are connected to a terminal 16 of the scanning head 1.

In the scanning head 1, there are provided an end portion of the single mode optical fiber 4 and a lens 5 for collecting the light from the optical fiber 4. The light projecting end 13 of the single mode optical fiber 4 is covered with a sleeve made of metal or the like and secured in the scanning head 1 by means of a securing member (not shown). The light collected by the lens 5 is projected outside through a window 15 toward a point P of the object 6 to be read.

A photo diode 7 is provided inside the window 15 of the scanning head 1 for receiving light reflected from the point P, thereby producing an electric signal representing the intensity of the reflected light. The electric signal of the photo diode 7 is transferred to the calculation unit 9 in the floor type unit 2 through the communication cable 8. The calculation unit 9 processes the electric signals fed from the photo diode 7 so as to produce electric signals representing the object code in a known manner.

According to the embodiment of the present invention, the light emitted from the light source 1 is entered in the single mode optical fiber 4 and the light is closed in the optical fiber core of a small size. The light projected from the end of the single mode optical fiber 4 is throttled by the lens 5, whereby the light beam can be throttled into a small diameter.

Since the light is projected from the optical fiber core having a true circle shape in its cross section, the shape of the light spot of the light beam projected from the single mode optical fiber 4 is also a true circle shape, and the spot size of the light beam can be reduced by the lens 5. The single mode optical fiber 4 is used so as to collect the light into a small area and to obtain the projected light beam pattern of a true circle shape.

Since the light source is not provided in the scanning head 1 but is provided in the floor type unit 2, the size and weight of the scanning head 1 can be reduced up to such a size that the scanning head is placed on a human palm.

Due to the diffraction of light, light beam has a finite spot size. When the light is throttled by means of a lens system, the spot size of the light at respective points further than the point at which the minimum spot size is obtained is expanded.

Figure 2:
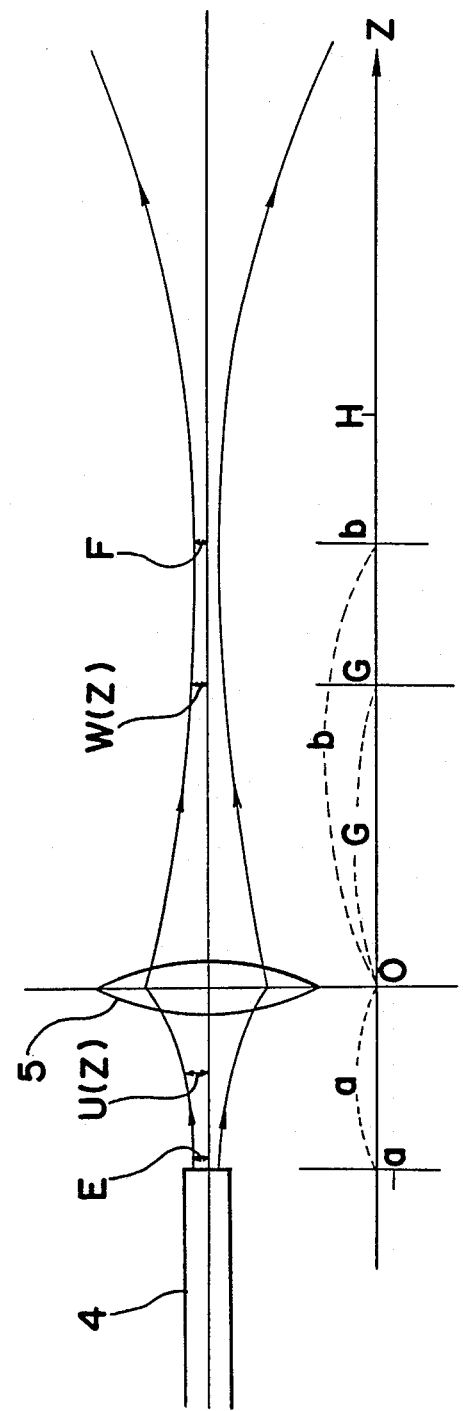
FIG. 2 is a schematic diagram showing a manner of throttling the light beam.

A condition for obtaining the minimum spot size is explained with reference to FIG. 2.

It is assumed that the center of the lens 5 is the origin O and the light projecting end of the single mode optical fiber 4 is positioned after the lens 5 with a distance a. Assuming further that the radius of the spot size of the light at the projecting end of the single mode optical fiber 4 is defined by E and the radius of the core of the single mode optical fiber 4 is $r_0$ and the normalized frequency of the single mode optical fiber 4 is V, the following equation is obtained.

$$r_c = (0.65 + 1.619/V^{\frac{3}{2}} + 2.879/V^6)E$$

Z axis is defined in the direction of the light progression. The end of the single mode optical fiber 4 is Z = −a. Assuming that the light beam is a gaussian beam, the radius of the spot size of the light beam between the end (Z = −a) of the optical fiber and the lens (Z = 0) can be expressed as $$U(Z)^2 = E^2[1 + \{\lambda(a+Z)/\pi E^2\}^2] \qquad (1)$$

In the equation (1) $\lambda$ is the wave length of light.

The radius of the light beam increases proportional to the square of the distance from the end of the single mode optical fiber 4.

When the light has passed the lens 5, the light is throttled and the spot size is reduced. Assuming that the spot size is at a minimum at a position Z = b, the position is referred to as a standard position. According to the assumption that the light beam is a gaussian beam, the spot size of the light beam after the light passed the lens 5 is expressed as $$W(Z)^2 = F^2[1 + \{\lambda(Z-b)/\pi F^2\}^2] \qquad (2).$$

It is best that the object to be read is positioned at the standard point Z = b, however, it is difficult to position the object at the standard point always. Therefore, there is defined an allowable range G to H with the center thereof taken at Z = b so that reading of the object can be performed so far as the object exists within the allowable range. The points G and H are referred to as the critical points.

The point G near the lens 5 is called a near critical point. The point H far from the lens 5 is called a far critical point.

The respective beam sizes W(G) and W(H) at the critical points G and H are the same value which can be calculated by the equation (2) using $\Delta = G - b = H - b$.

The beam sizes W(G) and W(H) are the function of the minimum beam radius F which can be selected as desired.

The value F for obtaining the minimum beam radius at the critical points G and H can be calculated by the following calculation by defining the value F as an independent variable.

Since an arithmetic mean is greater than a geometrical mean, $$W(G)^2 = W(H)^2 \div 2\lambda\Delta/\pi \qquad (3)$$

is obtained. In the above equation, equality is established when $$Fm = \sqrt{\lambda\Delta/\pi} \qquad (4).$$

The distance b up to the object and width $\Delta$ up to the critical point are given preliminarily. By the equation (4), the optimum minimum beam size Fm can be obtained.

The beam radius at the critical point is $$W(G) = W(H) = \sqrt{2\,FM} \qquad (5).$$

Since the values of the equations (1) and (2) when Z = 0 are equal, $$E^2\left(1 + \frac{\lambda^2 a^2}{\pi^2 E^4}\right) = F^2\left(1 + \frac{\lambda^2 b^2}{\pi^2 F^4}\right) \qquad (6)$$

thus, the value a can be obtained $$a = \frac{\pi E}{\lambda}\sqrt{F^2 - E^2 + \left(\frac{\lambda b}{\pi F}\right)^2} \qquad (7)$$

According to the equation (7), the value a can not be decided unless the value F is specified.

Under such a condition that the beam size is made minimum at the critical points G and H, by placing the value Fm for F, the value a can be obtained by the equation $$a = \frac{\pi E}{\lambda}\sqrt{\frac{\lambda\Delta}{\pi} + \frac{\lambda b^2}{\pi\Delta} - E^2} \qquad (8)$$

Since the value b is preliminarily given and the value a can be obtained by the equation (8), the focal point f of the lens 5 can be calculated $$1/f = 1/a + 1/b \qquad (9)$$

EXAMPLE

An example of the device according to the present invention was provided using a single mode optical fiber of which radius E is 2.4 $\mu$m. The standard point b was 250 mm, near critical point G was 200 mm, the wave length $\lambda$ of the light was 0.75 $\mu$m and $\Delta$ was 50 mm.

From the equation (4), the beam radius Fm was 109 $\mu$m and the beam radius W(G) of the near critical point was 154 $\mu$m. The value a was 5.58 mm and the focal length of the lens was 5.46 mm according to the value b was 250 mm.

Therefore, when the light source of which wave length 0.75 $\mu$m is used and the light is applied to the single mode optical fiber of 2.4 $\mu$m radius of the spot size, by placing the lens 5 at the position apart from the end of the single mode optical fiber 4 with the distance 5.58 mm, the spot size of the light at the near critical point is 154 $\mu$m radius can be obtained.

According to the present embodiment, the light to be projected to the object is passed through the single mode optical fiber 4 and in turn the lens 5, so that the light beam can be throttled and the beam size is reduced enough keeping the spot shape in a true circle even if the point at which the light beam is projected is departed away from the window 15 of the scanning head 1, whereby a high reading resolution of the object can be obtained.

Moreover, since the light source and control unit including the calculation unit 9 are accommodated in the floor unit 2, it is possible to reduce the size of the scanning head 1. Therefore, the scanning head shown in the present embodiment is suitable for a hand scanner for a code reading device.

Figure 3:
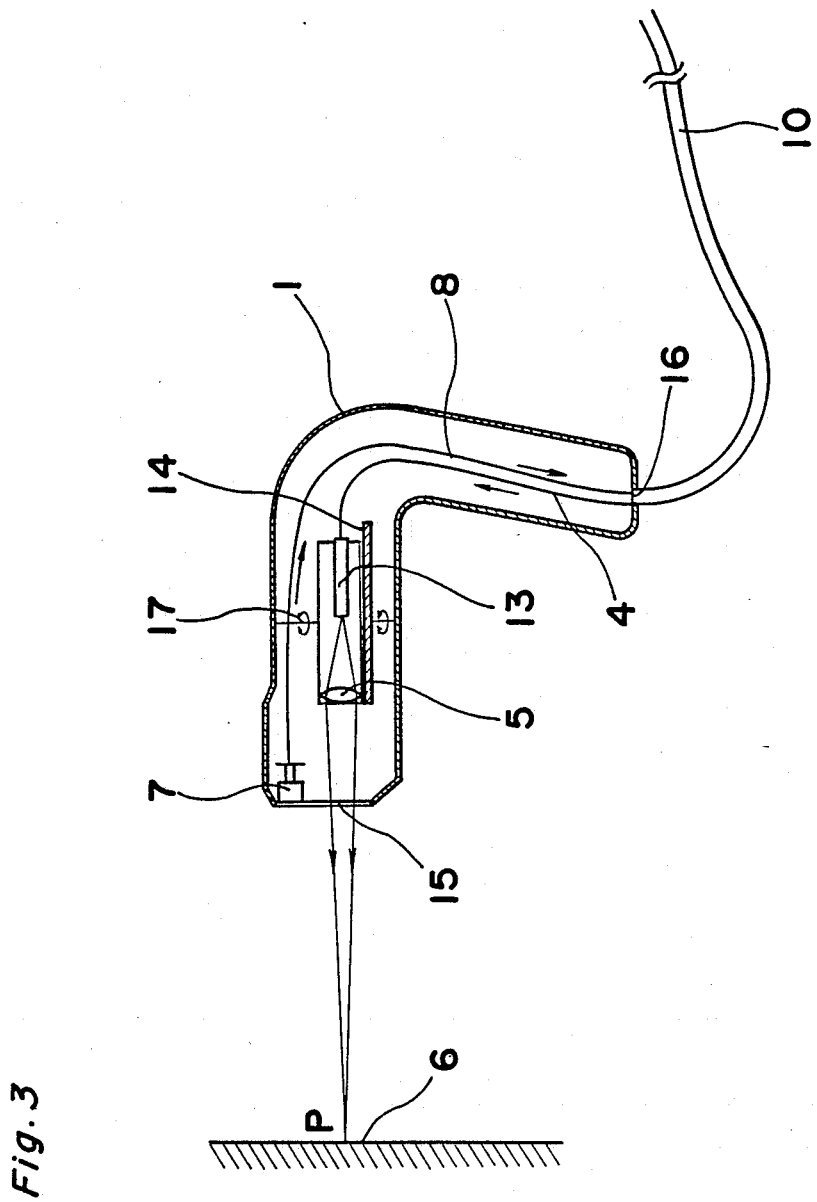
FIG. 3 is a cross sectional view showing another embodiment of the optical code reading device according to the present invention.

Referring to FIG. 3 showing another preferred embodiment of the present invention, wherein the light projecting end 13 and the lens 5 are mounted on a rotation mechanism 14 which is reciprocally rotatable around a rotation asxis 17 in one plane (in a horizontal plane) by a predetermined angle range so that the light projecting end 13 and lens 5 can also rotate and the light beam projected from the lens 5 can be moved along a scanning direction which is perpendicular to the axis of the lens 5. The rotation mechanism 14 is driven to rotate as mentioned above by a driving mechanism (not shown) which is provided in the housing of the scanning head 1. The power source for an electric motor (not shown) of the driving mechanism may be accommodated in the floor unit 2 and the power for the electric motor is transferred to the scanning unit 1 by means of a suitable cable (not shown). Such cable may be covered with the optical fibers 4 and 6 in the sheath 10.

By rotating the rotation mechanism 14 reciprocally in a predetermined angle range, the direction of the light projected from the lens 5 is changed along the scanning direction and the object 6 can be scanned in a direction perpendicular to the lens axis, so that the detection point P can be changed time to time, whereby the light reflected from the code or character on the object 6 can be consecutively detected by the photo diode 7.

Since the rotation mechanism mounts only light weight elements such as the lens 5 and the light projecting end 13 of the single mode optical fiber 4, it is possible to make the rotation mechanism simple.

Moreover, since the reflection mirror is not provided in the scanning head, the problem of staining the mirror can be eliminated and the scanning head can be used under a bad atmosphere.

Figure 4:
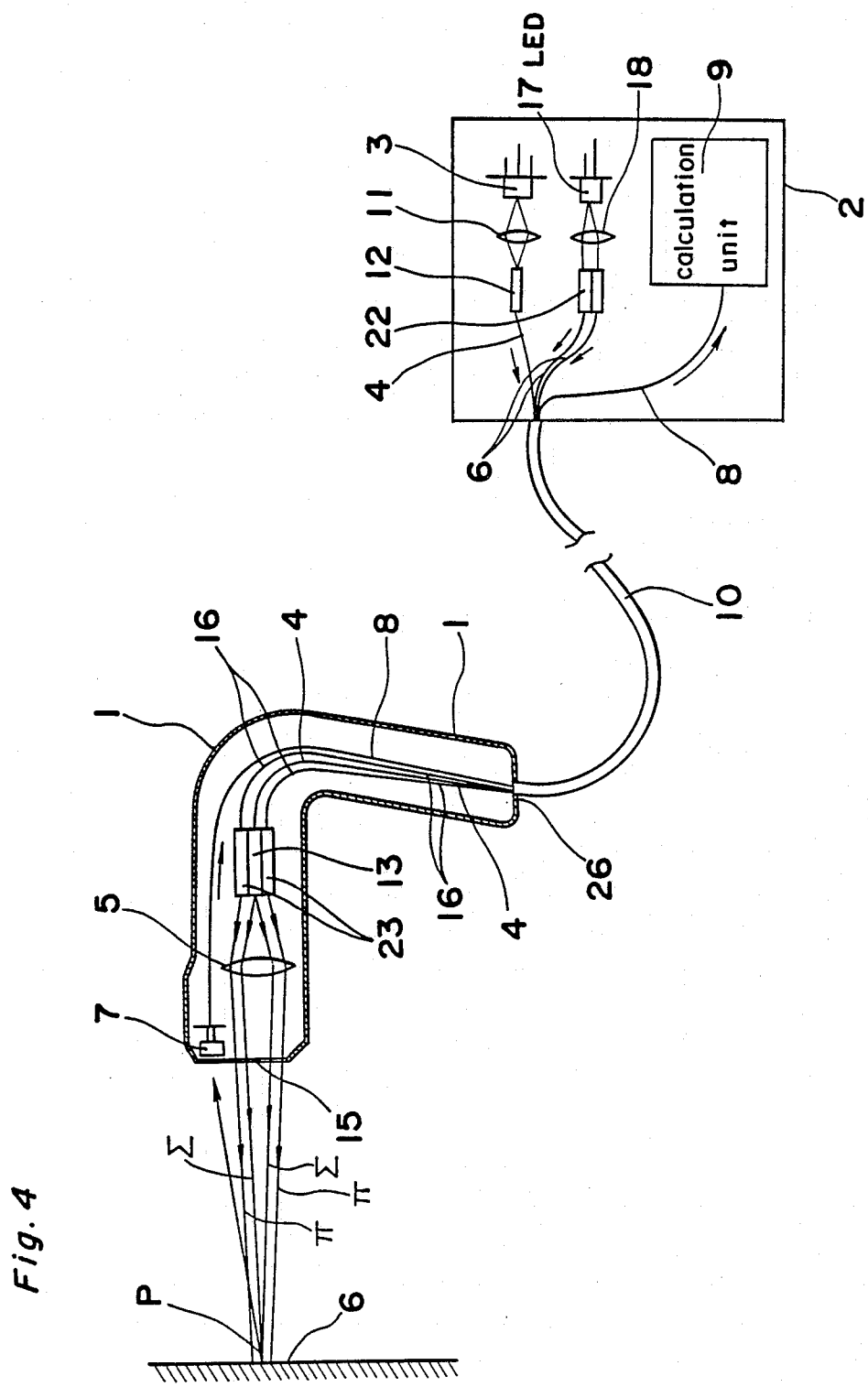
FIG. 4 is a cross sectional view showing a further embodiment of the optical code reading device according to the present invention.

Referring to FIG. 4 showing a further embodiment of the present invention, there is provided in the floor unit 2 an LED 17 (light emitting diode) as an additional light source for emitting visible light. The light emitted from the LED 17 is used to sight the light beam of the laser 3 on the object and therefore the light of the LED 17 is referred to as a sighting light hereinafter. The spot size of the sighting light is not necessarily fine, and various colors of LEDs are available in the market, therefore, an LED is used as the source of the sighting light. In place of LED, an incadscent lamp may be used as the sighting light source.

The light from the light source 3 is pulse modulated, while the light from the LED 17 is a D.C. light.

Figure 5:
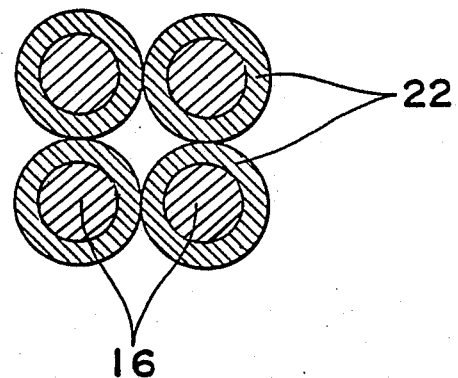

There are further provided in the floor unit 2 a collimating lens 18 in front of the LED 17 to collimate the light from the LED 17 and a plural number of optical fibers 16 of a multi mode type each provided with a light input end 22 in the form of a cylindrical sleeve made of metal. In the example shown, four optical fibers are used and the cross sectional view thereof is shown in FIG. 5.

There may be used a single optical fiber for transferring the lght of LED. However, preferably a plurality of optical fibers may be used so that a large amount of light can be transferred to the scanning head as many as possible.

There may be used one or more optical fibers of the single mode type. However, preferably the multi mode type optical fiber is used so that a large amount of light can be transferred to the scanning head as possible.

The light of the LED 17 is collimated by the collimating lens 18 and the collimated light is applied to the light input ends 22 of the four multi mode optical fibers 16.

Figure 6:
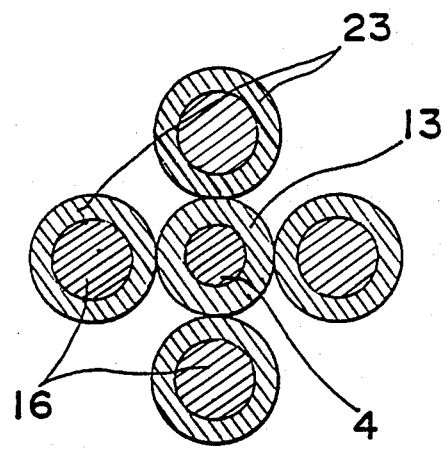
FIGS. 5 and 6 are cross sectional views showing details of the arrangement of the optical fibers used in the embodiment shown in FIG. 4.

The four multimode optical fibers 16 and the single mode optical fiber 4 as well as the communication cable 8 are covered by the sheath 10 and coupled to the scanning head 1 through an end terminal 26. The multi mode optical fibers 16 are ended at output ends 23 made of sleeve and arranged in a manner as shown in FIG. 6. As shown in FIG. 6, the multi mode optical fibers 16 and the sleeves or output ends 23 are disposed around the peripheral portions of the sleeve 13 of the single mode optical fiber 4. The number of the output ends 23 is equal to the number of the multi mode optical fibers 16. The beams of the sighting light $\pi$ projected from the output ends or sleeves 23 are throttled by a lens 5 as well as the light $\Sigma$ of reading the object from the single mode optical fiber 4. Both of light beams $\pi$ and $\Sigma$ are projected on the object 6 through the window 15.

Since the output ends 13 and 23 are arranged similar to a coaxial manner, the light axis of the sighting light $\pi$ and that of the light $\Sigma$ for reading the object coincide without light axis adjustment.

The reading light $\Sigma$ is projected on the object 6 with a small spot size and the sighting light $\pi$ is projected on the object 6 with relatively large spot size surrounding the spot of the reading light so as to facilitate to see the scanning point P at which the reading light $\Sigma$ is projected.

The light reflected from the scanning point P is received by the photo diode 7 and the intensity of the reflected light corresponds to the brightness and darkness of the scanning point or code to be read whereby the degree of the brightness and darkness of the scanning point P can be detected by the output of the photo diode 7. The output of the photo diode 7 is fed to the calculation unit 9 in the floor type unit 2 through the communication cable 8.

Since the reflected light contains reading light $\Sigma$ and sighting light $\pi$. However, since the reading light $\Sigma$ is pulse modulated, by taking the pulse modulated component in the output of the photo diode 17 by the calculation unit 9, the component of the sighting light $\Sigma$ can be detected and the code or character of the object can be read.

Since the detecting point P to which the reading light is projected is illuminated by the sighting light $\Sigma$, the detecting point can be easily seen, whereby scanning operation of the scanning head is easy.

In the arrangement mentioned above, since the reading light $\Sigma$ and sighting light $\pi$ can be combined only by the optical fibers and lens and there is no need to provide such as half mirror used in the prior art, the scanning head can be made small in size and light in weight and the structure of the scanning head becomes simple. Moreover, adjustment of light axes of the reading light $\Sigma$ and the sighting light is unnecessary, the scanning head can manufactured easily.

What is claimed is:

1. An optical code reading device comprising:
   a laser light source for emitting laser reading light for illuminating a code to be read;
   only one single mode optical fiber for transferring the reading light from the light source having one end positioned to receive the reading light from the light source;

a lens system disposed to receive the reading light projected from the other end of the optical fiber and to project the reading light toward the code;

light detecting means for receiving the light reflected from the code and generating an electric signal representing the intensity of the reflected light; and processing means for processing the electric signal to produce an electric signal representing the code.

2. The optical code reading device according to claim 1, wherein said light detecting means and said lens system are disposed in a scanning head and said light source is disposed in a floor type unit.

3. The optical code reading device according to claim 1, wherein said light source is a semi conductor laser.

4. The optical code reading device according to claim 1 wherein said light source is a He-Ne laser.

5. The optical code reading device according to claim 2, wherein said light detecting means is a photo diode.

6. The optical code reading device according to claim 1, wherein said other end of the optical fiber and lens system are mounted on a rotatable mechanism.

7. An optical code reading device for use in a code reading device comprising:

a laser light source for emitting laser reading light for illuminating a code to be read;

only one single mode optical fiber for transferring the reading light from the light source having a first end and a second end, said first end positioned to receive the reading light from the light source;

a lens system disposed to receive the reading light projected from the second end of the optical fiber and to project the reading light toward the code;

light detecting means for receiving the light reflected from the code and generating an electric signal representing the intensity of the reflected light;

processing means for processing the electric signal transferred for producing an electric signal representing the code;

an additional light source for projecting visible light for sighting said reading light; and at least one additional optical fiber for transferring the visible light from said additional light source having a first end and a second end, said first end disposed to receive said visible light from said additional light source and said second end disposed adjacent to the second end of said single mode optical fiber so that the visible light can be projected with the reading light toward the code to be read, thereby visually indicating the detecting point on the code by the visible light.

8. The optical code reading device according to claim 7, wherein a plurality of additional optical fibers for transferring said visible light from said additional light source are disposed around the peripheral portion of the optical fiber of the reading light so that the reading light and visible light can be projected on the code in a coaxial manner.

9. The optical code reading device according to claim 7, wherein said light detecting means and said lens system are disposed in a scanning head and said light source is disposed in a floor type unit.

10. The optical code reading device according to claim 7, wherein said light source of the reading light is a semi conductor laser.

11. The optical code reading device according to claim 7 wherein said light source of the reading light is a He-Ne laser.

12. The optical code reading device according to claim 7, wherein said light detecting means is a photo diode.

13. The optical code reading device according to claim 7, wherein said light source of the visible light is a light emitting diode.

* * * * *

UNITED STATES PATENT AND TRADEMARK OFFICE
CERTIFICATE OF CORRECTION

PATENT NO. : 4,847,490
DATED : July 11, 1989
INVENTOR(S) : Mitsuru Nishikawa

It is certified that error appears in the above-identified patent and that said Letters Patent is hereby corrected as shown below:

ON THE FIRST INFORMATION PAGE:

Please Change

"(75) Inventor: Mitsuru Nishikama, Osaka, Japan." to

---(75) Inventor: Mitsuru Nishikawa, Osaka, Japan. ---

Signed and Sealed this

Twenty-sixth Day of June, 1990

Attest:

HARRY F. MANBECK, JR.

*Attesting Officer*  *Commissioner of Patents and Trademarks*